(12) United States Patent
Duckeck

(10) Patent No.: US 7,587,186 B2
(45) Date of Patent: Sep. 8, 2009

(54) METHOD FOR THE RADIO TRANSMISSION OF TRAFFIC MESSAGES AND RADIO RECEIVER

(75) Inventor: Ralf Duckeck, Hildesheim (DE)

(73) Assignee: Robert Bosch GmbH, Stuttgart (DE)

( * ) Notice: Subject to any disclaimer, the term of this patent is extended or adjusted under 35 U.S.C. 154(b) by 610 days.

(21) Appl. No.: 11/404,284

(22) Filed: Apr. 14, 2006

(65) Prior Publication Data

US 2007/0245143 A1 Oct. 18, 2007

(51) Int. Cl.
*H04B 1/18* (2006.01)
(52) U.S. Cl. ............... 455/186.1; 455/410; 455/67.7; 713/168; 713/155; 713/170; 235/382
(58) Field of Classification Search .......... 455/186.1, 455/410, 67.7; 713/168, 155, 170; 235/382
See application file for complete search history.

(56) References Cited

U.S. PATENT DOCUMENTS

2002/0007453 A1* 1/2002 Nemovicher ............. 713/155

2007/0029379 A1* 2/2007 Peyer ..................... 235/382

FOREIGN PATENT DOCUMENTS

| DE | 35 36 820 | 4/1987 |
|---|---|---|
| DE | 19905893 | 8/2000 |
| EP | 0818898 | 1/1998 |

\* cited by examiner

*Primary Examiner*—Sanh D Phu
(74) *Attorney, Agent, or Firm*—Kenyon & Kenyon LLP

(57) ABSTRACT

A method for transmitting encoded traffic messages via a data channel, which is reserved for transmitting encrypted traffic messages, a certain subset of traffic messages being in general transmitted via the data channel in unencrypted form. For the encryption of the traffic messages, in each case only one of at least two components of the traffic message being encrypted. The unencrypted component containing information, or information is assigned to the unencrypted component as to whether the first component of the traffic message is encrypted, traffic message transmitter and receiver. Particularly important traffic messages may be transmitted via encrypted channels in a manner that also allows receivers that are not designed to decrypt encrypted messages to output these traffic messages or to process them further in other ways.

5 Claims, 5 Drawing Sheets

| ENCID | Rotate right (hex) | Start Bit | XOR value (hex) |
|---|---|---|---|
| 0 | 0 | 0 | 0 |
| 1 | 8 | 1 | 19 |
| 2 | 4 | 3 | 9B |
| 3 | C | 6 | 7E |
| 4 | 2 | 7 | 39 |
| ... | 1 | 8 | 4B |
| 31 | 3 | 1 | AB |

Fig. 4

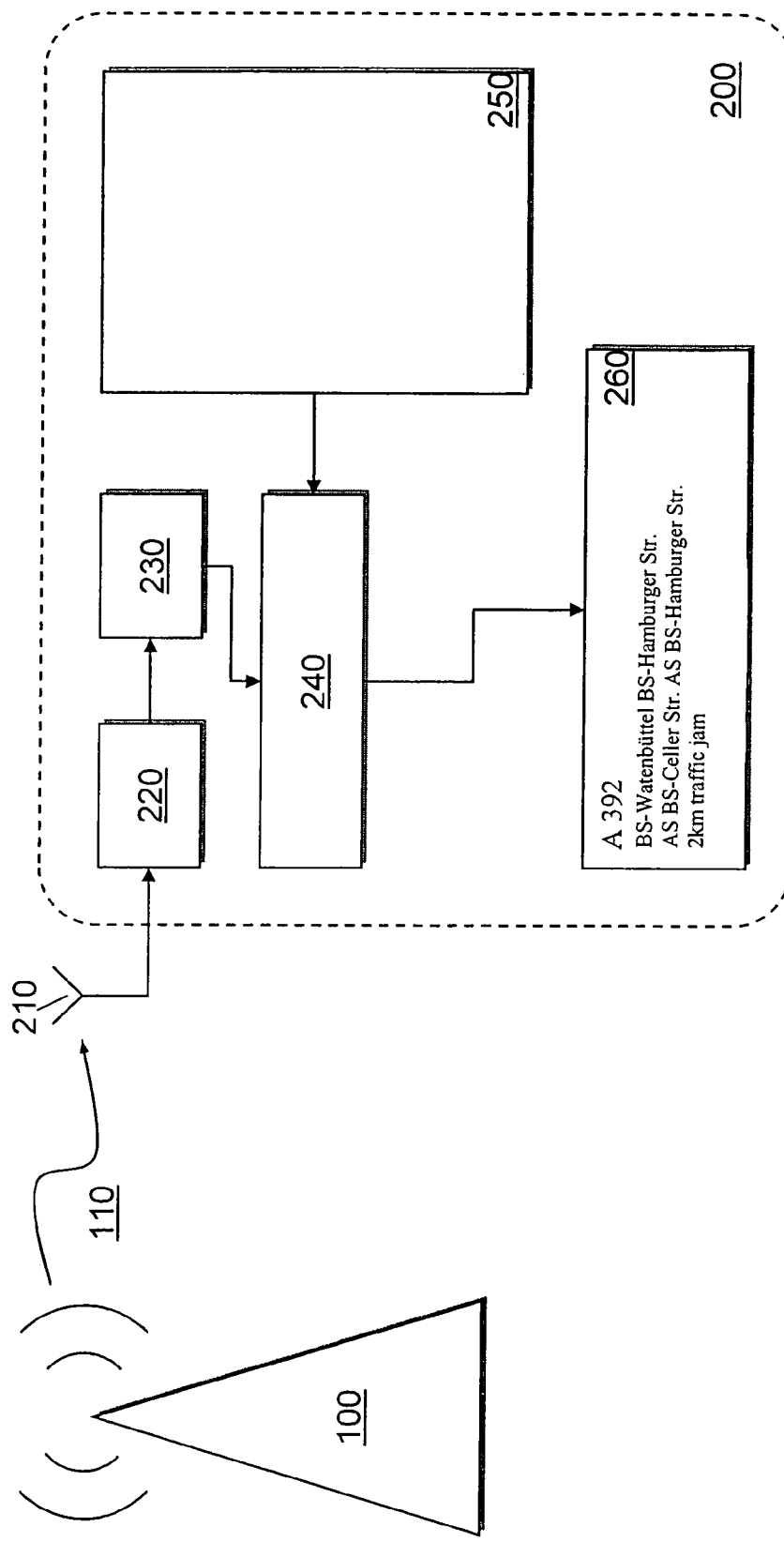

METHOD FOR THE RADIO TRANSMISSION OF TRAFFIC MESSAGES AND RADIO RECEIVER

INCORPORATION BY REFERENCE

This application relates to German Patent Application No. 10 2004 055 576.1, expressly incorporated herein by reference in its entirety.

FIELD OF THE INVENTION

The present invention relates to a method for the radio transmission of traffic messages and a radio receiver for receiving traffic messages.

BACKGROUND INFORMATION

German Patent No. DE 35 36 820 C2 and the ISO standards 14819-1, -2 and -3 describes a method for the radio transmission of encoded traffic messages. The TMC (traffic message channel) method described therein follows the approach of disassembling conventional traffic messages into their elementary components, that is, particularly the location of an event, the direction of travel, the extent of the event and the event itself, of cataloging these components and assigning corresponding predefined codes to the catalogued components of the traffic messages. Instead of the traffic messages themselves, only the codes assembled in accordance with the message to be transmitted are then transmitted. For example, particularly important points along important traffic routes, that is, for example, entrances and exits, gas stations, rest areas etc. along expressways, are assigned so-called location codes. In a location table, these location codes are each assigned location names as well as references to locations preceding or following the respective location along the route or to their location codes. By transmitting such a location code and a travel direction, the location of a traffic-related event on a route section between two coded locations and a determinate travel direction are thus defined. So that only a limited address space needs to be made available for the location codes, different location tables are provided for the different countries, a particular country-specific location table being identifiable via an assigned location table number (LTN).

In the radio unit, the transmitted codes are assigned to corresponding message components with the aid of locally stored decoding tables and are subsequently shown on the display or are converted into spoken messages using language synthesis and output via the connected loudspeakers.

These TMC traffic messages are transmitted inaudibly along with a radio broadcast program via a radio frequency, for example, using the so-called radio data system (RDS), which is specified for example in DIN/EN 50 067.

RDS-TMC is currently implemented in two variants throughout Europe. On the one hand as a free service, which can be received in broad areas of Europe, on the other hand as a pay service (Pay TMC or Conditional Access (CA)), which is offered, among other places, in France, Great Britain and in parts of Germany. This service is often offered by private service providers and requires special software in the receivers so that these are able to decode the encrypted traffic messages. The providers additionally require that the terminal unit manufacturers pay a certain fee to the providers for each unit that is to be able to decode CA.

SUMMARY

Since a portion of the information for the TMC are provided by the police free of charge as a safety-related service there is now the demand particularly on the part of European governmental traffic departments that CA providers also transmit or provide certain messages free of charge to terminal units and users. Since this is currently not yet possible for system-related reasons—there is either free TMC or CA, but no mixture of the two—a solution has to be found for this.

One approach preferred by the CA providers would have the government departments obligate all terminal unit manufacturers to offer CA in their units. With this all terminal units would be able receive and decode all and hence also the above-mentioned CA-TMC traffic messages. This would mean, however, that the terminal unit manufacturers would also automatically have to pay the CA providers for licenses for all terminal units. This approach, however, is not acceptable from the perspective of the terminal unit manufacturers and for users who in the end would have to pay the surcharge for the CA capability of the terminal units.

An embodiment of the present invention may achieve the above objective by a different approach.

In one embodiment, within a transmission channel used for transmitting normally encrypted conditional access information, generally accessible unencrypted information is transmitted as well. For this purpose, the receiver is configured to detect within the volume of incoming information or messages those that are transmitted in an unencrypted manner and then to evaluate these specifically, while ignoring encrypted messages.

For detecting unencrypted messages, the receiver preferably accesses non-encrypted message components that contain a direct or indirect indication as to whether the currently incoming messages are encrypted or unencrypted messages.

In the case of TMC traffic messages, for example, an indirect indication is offered by the event codes since, according to the standard, one of several possible urgencies is assigned to each catalogued traffic event. In the case of TMC traffic messages, an embodiment of the present invention provides for messages catalogued as particularly urgent (x-urgent), such as information about errant drivers (e.g. ghost drivers) on expressways, always to be transmitted unencrypted. By analyzing the event code, the receiver is able to determine whether or not the message is of particularly high urgency and, in the event that there is a particularly urgent message, to assume that this was transmitted unencrypted.

Since in the CA-RDS-TMC currently in operation, only the location codes for traffic events are transmitted encrypted, the transmitted location codes may be used without further decryption in the case of particularly urgent messages, that is, those that have a corresponding event code that is catalogued as particularly urgent. In the case of encrypted location codes, on the other hand, these and the associated other message components are ignored since the further use of encrypted location codes without decryption would result in faulty messages.

BRIEF DESCRIPTION OF THE DRAWINGS

FIG. 4 shows a receiver-side description table.

FIG. 5 shows an example system according to an example embodiment of the present invention.

DETAILED DESCRIPTION OF EXAMPLE EMBODIMENTS

Figure 1:
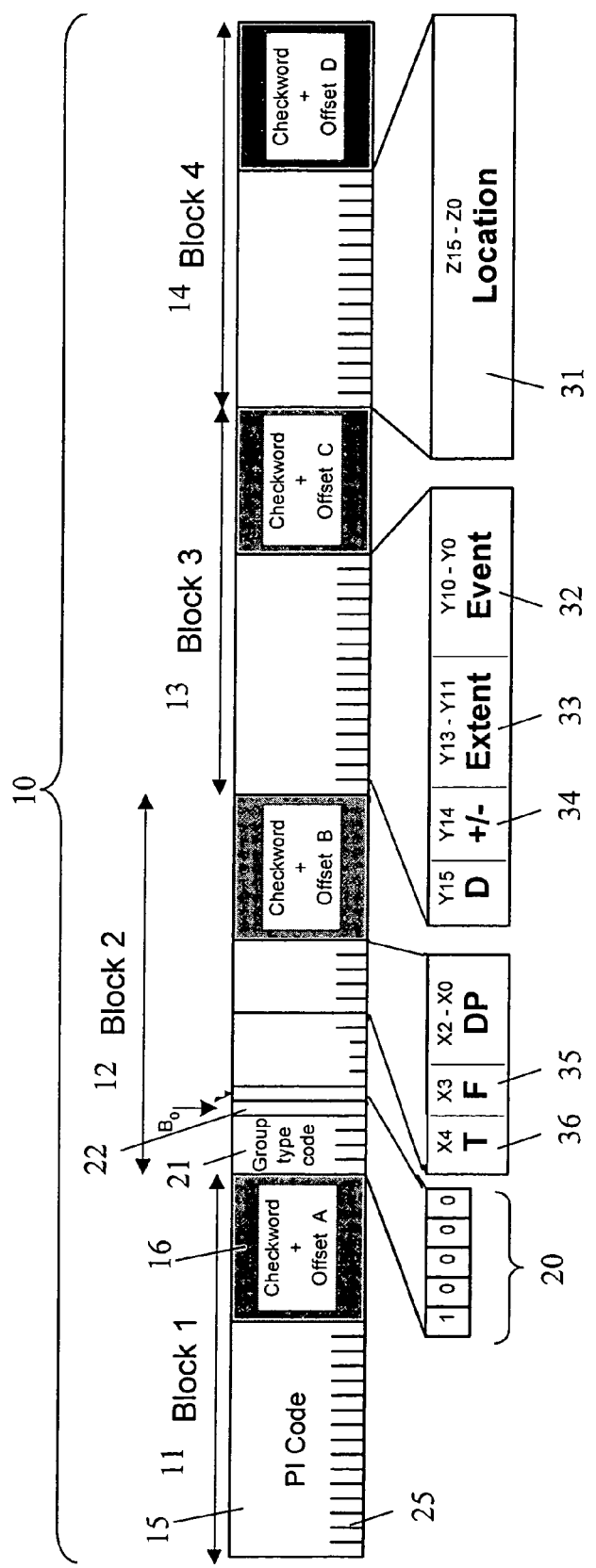
FIG. 1 shows an example RDS signal.

The present invention is described below with reference to the example of RDS-TMC traffic messages. In principle, the present invention, however, may also be applied to other radio transmission standards such as digital radio (DAB—digital audio broadcasting, DMB—digital multimedia broadcasting, DVB—digital video broadcasting and others), for example, or also to other transmission methods such as, for example, mobile telephony transmission (GSM—global system for mobile communication, UMTS and others).

The structure of the radio data signal, called RDS signal below, as well as the encoded TMC traffic messages transmitted by it are explained in more detail below with reference to FIG. 1.

The RDS signal 1 is composed of a series of data blocks 10, which are also called groups. Each group 10 is made up of four blocks 11, 12, 13, 14 at 26 bits each, of which in each case the first 16 bits 15 are available for the actual useful data, while the remaining 10 bits 16 are used for transmitting redundancy information for error detection and correction (checkword) and for synchronizing the receiver (offset). Different group types are provided for transmitting different kinds of information. For identifying the respective group type, a group type code (GT) 21 is provided, which comprises the first four bits X15, X14, X13 and X12 of the second block of each group. Furthermore, a version bit (B0) 22, the fifth bit X11 of the second group, is provided. The combination 20 of group type code and version bit B0 is used to identify a group type in the narrower sense. A particularly important piece of data of the RDS signal, which, for this reason, is transmitted in each group in the first block, is the program identification code (PI) 15. This is used for the definite identification of a specific radio broadcast program and additionally includes a country identifier, which indicates the location of the broadcasting station and the program identifier itself, which indicates a particular radio broadcast program such as e.g. the third program of the Süd-Westdeutscher-Rundfunk (South-West German Radio—SWR). A detailed description of the radio data system (RDS) is in DIN EN 50 067, for example.

FIG. 1 shows in an exemplary manner a group of the type 8A, that is, having GT 8, version A. This group is used for transmitting coded TMC traffic messages in accordance with the ISO 14819-1, -2, -3 standard. The main components of such a TMC traffic message are the location 31 of the event, for which the 16 bits Z15-Z0 of the last block are available, the type of traffic event 32, e.g. traffic jam, stop-and-go traffic, road block etc., for the coding of which the last 11 bits of the third block are reserved, the extent 33 of the event, measured by the number of locations over which the event or the resulting traffic interruption extends, comprising bits Y13, Y12 and Y11 of the third block and a bit Y14 of the third block for encoding the direction of travel (+/−) 34.

The example of FIG. 1 shows a so-called one-sequence message, that is, a traffic message that is transmitted by a single group of the RDS signal. Here, bit 35 (F) has the value "1". On the other hand, there are also multi-sequence messages in case the capacity of a single group 8A of the RDS signal is insufficient for transmitting a traffic message. To identify such multi-sequence messages, bit 35 (F) is set to the value "0". A detailed description is found in ISO 14819-1, -2 and -3. In addition, there are also multi-sequence messages as are explained in ISO 14819-1, -2, -3 for example.

Figure 2:
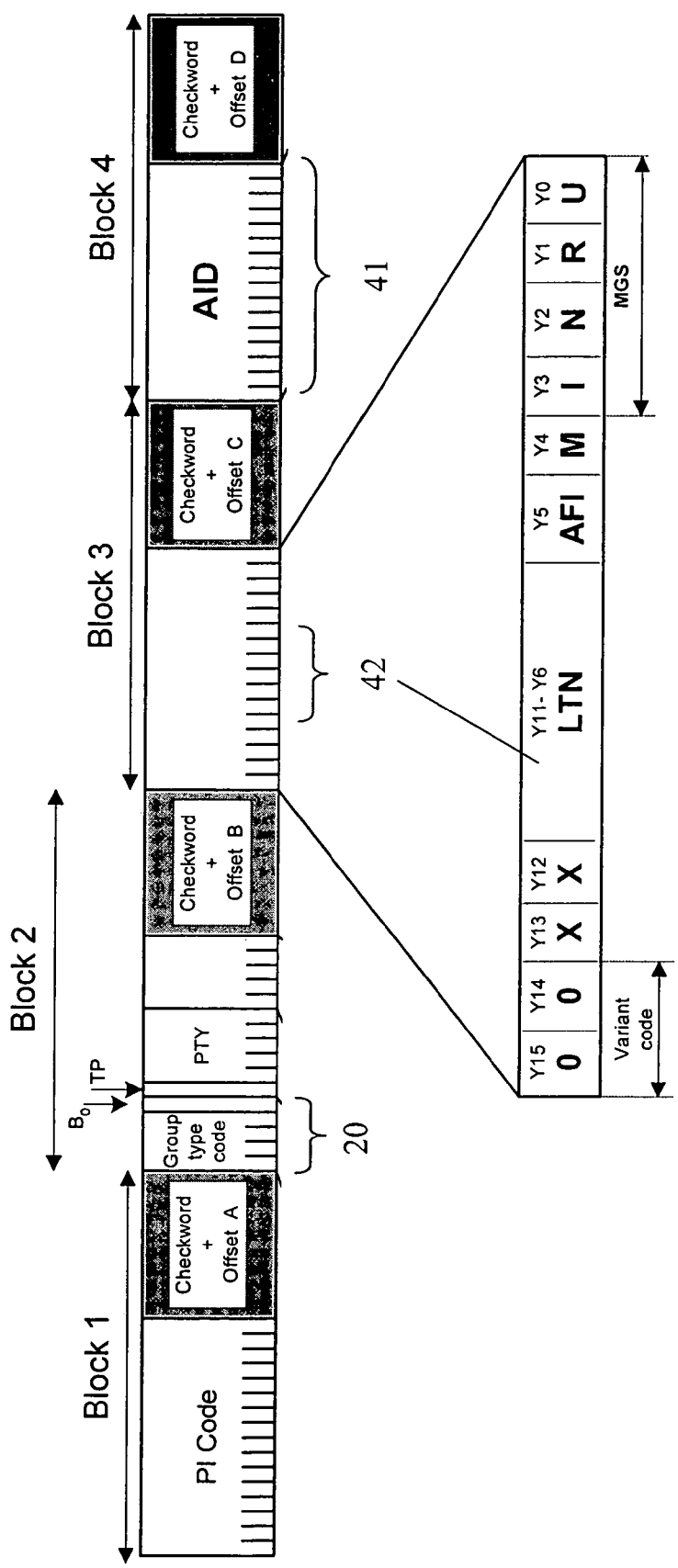
FIG. 2 shows an example RDS signal including data to announce TMC traffic messages.

Since in groups of type 8A, information other than the actual TMC traffic messages may be transmitted as well, groups of the type 3A are sent ahead in the RDS data stream to announce type 8A groups containing TMC traffic messages (FIG. 2). These contain in fourth block 14 a so-called application identifier (application ID, AID) 41, which indicates what type of information is transmitted in the subsequent groups of the type 8A, that is, in the present case, TMC messages. These further contain a location table number (LTN) 42, which indicates which of a plurality of possible location tables was used for encoding the event locations on the side of the transmitter and should consequently also be used on the side of the receiver for decoding the location code. Different location tables allow, for example, for encoding locations in several countries, i.e., there is a first location table for Germany, a second location table for France, etc.

Finally, the standard also provides for groups of the type 8A, in which administrative information (ADMIN 8A) is transmitted.

These differ from the groups of type "8A" carrying the actual traffic messages by bit "T" 36, which in the case of an administrative group has the value "1", and in the case of traffic message groups, by contrast, has the value "0".

For decoding these TMC messages according to the ALERT C standard, as described for example in the ISO 14819-1, -2 and -3 standards, first the country and the applicable location table must be identified. The LTN (location table number) together with the program identification (PI) code of the transmitter is used for this purpose. From these two items of information it is possible to ascertain precisely in which country one is located and which LTN is currently used. In this manner, any free TMC service can be identified and decoded.

The standard was later expanded to be backward-compatible so as to allow for conditional access TMC. For this purpose, the code 0 (zero), which was defined as "undefined" in the old standard, is transmitted in group 3A instead of the valid LTN. A device according to the old standard cannot do anything with this code and ignores the CA-TMC traffic messages contained in the subsequent groups of type 8A. On the basis of the LTN "0", a for receiving CA-TMC traffic messages detects that the service is transmitting encrypted traffic messages. In this context, the encryption of the traffic messages occurs on the side of the transmitter via an encryption of the location codes according to one of several possible instructions.

Figure 3:
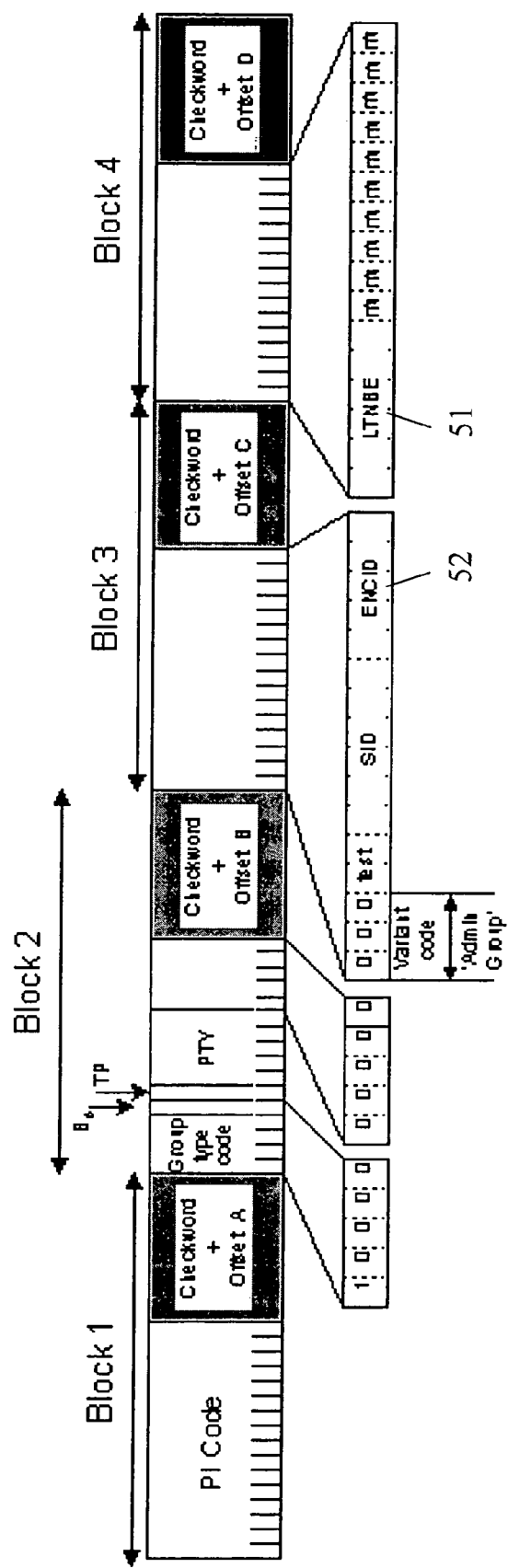
FIG. 3 shows an LTN transmitted in a special 8A group.

In order to be able to decrypt these encrypted location codes on the side of the receiver, first the actual LTN (before encryption) 51 is transmitted in a special 8A group (FIG. 3), which may normally be the same number as for the free TMC service. Furthermore, a decryption identification number (encryption ID ENCID) 52 is transmitted, which in a receiver-side decryption table (FIG. 4, reference numeral 60) indicates which one of several decryption instructions 61 is to be used. Decryption table 60 is available to all terminal device manufacturers who pay the service provider for the respective licenses for using CA-TMC. Using the correct decryption instruction, the encrypted received location codes can be assigned the correct location codes, which in turn may be assigned locations using the location table.

At least certain, that is, particularly urgent messages, which are indicated as x-urgent in the event catalog (e.g., errant or ghost drivers, danger alarms, human beings, animals and objects on the roadway), must always be made available as free messages. This would also satisfy the requirements of the governmental traffic departments. These messages must always be transmitted together with unencrypted location codes 31. Since future receivers will also be able to detect LTN 0 and in the respective group 8A will also be able to read the correct LTNBE (before encryption) 51, which, as already mentioned, is mostly identical to the usual national LTN, the message can then be correctly received since the code is available in unencrypted form and the otherwise required decryption table with the keys is not necessary and thus also no licensing fees have to be paid for conditional access TMC.

Additionally, the RDS-TMC standard also defines that by using an additional label the "default urgency", that is, the normally set urgency of a message, may be changed, in this case in particular increased (see, e.g., EN ISO 14819-1, Chapter 5.5.3, Label 1, Code 0). With this option, messages of normal urgency may also be converted to x-urgent and be transmitted, in accordance with the present invention, with an unencrypted location code.

FIG. 5 shows a system made up of a broadcast transmitter 100 and a broadcast receiver 200 for implementing the method according to an example embodiment of the present invention.

Transmitter 100 encodes traffic messages in general according to the conditional access (CA) method. This means that for traffic events, which do not have the highest urgency assigned to them in the event catalog, the associated event location, that is, for example, an accident location, is encoded using an encrypted location code. In the case of traffic events, which by contrast have been assigned the highest urgency in the event catalog, the event location, on the other hand, is encoded unencrypted using the location table.

The traffic messages encoded in this manner are broadcast in accordance with the conventional CA-TMC method as broadcast signal 110. This means that on the one hand an RDS group 3A having location table number (LTN) "0", furthermore, a group 8A according to FIG. 3 having the unencrypted location table (LTNBE) and the decryption identification number (ENCID) as well as a further group 8A having the event code (event), the travel direction (+/−) and the location code (location) is transmitted. In the case of a particularly urgent message, to which the standard urgency "x-urgent" is assigned in the event catalog, the transmitted location code is unencrypted, while in the case of a lower urgency it is encrypted.

Via an antenna 210, receiver 200 receives broadcast signal 110 broadcast by transmitter 100, which contains encrypted (CA-) TMC traffic messages. In a subsequent receiving part 220, the broadcast signal is demodulated and the RDS signal is isolated. From this, the actual RDS information, in this case particularly the TMC information, is obtained in a subsequent RDS demodulator 230. This information in turn is processed in a subsequent processor 240.

Processor 240 analyzes a group 3A obtained from the RDS signal as to whether it contains the LTN "0". If this is the case, the received broadcast signal is one that contains TMC traffic messages according to the conditional access method. On the other hand, if received group 3A contains another LTN, it is not a CA-TMC signal, but a freely accessible, non-encrypted TMC signal.

In the latter case, that is, if unencrypted TMC traffic messages are received, these may be decoded in the conventional manner and output (260) or processed further in other ways, e.g., so as to be taken into account in a vehicle navigation system for the purpose of a travel route calculation.

The former case, that is, if encrypted CA-TMC traffic messages are received, then the location table number (LTNBE) 51 is obtained from a subsequent administrative group 8A of the RDS signal.

In the subsequent groups 8A in each case the event code 32 is evaluated and checked as to whether the associated event is an event of normal, low or particularly high urgency (x-urgent). If it is an event of lower than the particularly high urgency, then processor 240 assumes that the associated location code of this message was transmitted encrypted. Since its use without decryption would result in faulty messages, the entire message is ignored.

If it is an event of particularly high urgency, on the other hand, processor 240 can assume that the associated location code was transmitted unencrypted and evaluates it using location table 250, the number of which it previously received in the form of the LTNBE, in the generally conventional manner by taking into account the country identifier of the PI code obtained from an arbitrary group of the RDS signal. The other message components, in particular the travel direction and the event, are likewise evaluated.

According to the refinement described above, the highest urgency can even be assigned to messages that normally have a low or normal urgency. For this purpose, in the context of a multi-sequence message, a corresponding urgency raising bit (label 1) is set in a subsequent group 8A. For this option, processor 240 is designed to evaluate this bit and to raise the urgency of the event. If the event then possesses the highest urgency, then the processor will again assume an unencrypted location code and decodes the message in a conventional manner.

What is claimed is:

1. A method for transmitting encoded traffic messages via a data channel, which is used for transmitting encrypted traffic messages, a certain subset of traffic messages being transmitted via the data channel in unencrypted form, the method comprising:

encrypting, by a transmitter device and for each traffic message to be encrypted, only one of at least two components of the traffic message, the unencrypted component including an indication of whether the one of the components of the traffic message is encrypted;

wherein:
the traffic message is encoded according to the TMC standard;
the one of the components includes a location of traffic event; and
the indication of the encryption of the one of the components is derived from an event code in the unencrypted component in combination with a piece of urgency-raising information in the unencrypted component.

2. The method as recited in claim 1, wherein the derivation of the indication of the encryption of the one of the components is indirectly from content of the unencrypted component.

3. A traffic message transmitter to transmit encoded traffic messages via a data channel used to transmit encrypted messages, a certain subset of traffic messages being transmitted via the data channel in unencrypted form, the transmitter comprising:

an encryption device configured to encrypt, for a traffic message to be encrypted, only one of at least two components of the traffic message, the unencrypted component including an indication of whether the one of the components is encrypted; and a transmitter configured to transmit the traffic message;

wherein:
the traffic message is encoded according to the TMC standard;
the one of the components includes a location of traffic event; and
the indication of the encryption of the one of the components is derived from an event code in the unencrypted component in combination with a piece of urgency-raising information in the unencrypted component.

4. A receiving device to receive traffic messages via a data channel used for transmission of encrypted messaged, a certain subset of traffic messages being transmitted via the data channel in unencrypted form, the receiving device comprising:
a receiver configured to receive, via an antenna, a broadcast traffic message; and
a processor configured to read the received traffic message and determine whether or not the received traffic message includes an encrypted component based on an indication in an unencrypted component of the traffic message;
wherein:
the traffic message is encoded according to the TMC standard; and
where the received traffic message includes the encrypted component:
the encrypted component includes a location of traffic event; and
the determination of the encryption of the encrypted component is based on an event code in the unencrypted component in combination with a piece of urgency-raising information in the unencrypted component.

5. A method for receiving an encoded traffic message via a data channel, which is used for transmitting encrypted traffic messages, a certain subset of the traffic messages being transmitted via the data channel in unencrypted form, the method comprising:
receiving, by a receiving device via an antenna, a broadcast traffic message; and
determining, by a processor of the receiving device and from the received traffic message, whether or not the received traffic message includes an encrypted component based on an indication in an unencrypted component of the traffic message;
wherein:
the traffic message is encoded according to the TMC standard; and
where the received traffic message includes the encrypted component:
the encrypted component includes a location of traffic event; and
the determination of the encryption of the encrypted component is based on an event code in the unencrypted component in combination with a piece of urgency-raising information in the unencrypted component.

* * * * *

UNITED STATES PATENT AND TRADEMARK OFFICE
CERTIFICATE OF CORRECTION

PATENT NO.       : 7,587,186 B2
APPLICATION NO.  : 11/404284
DATED            : September 8, 2009
INVENTOR(S)      : Ralf Duckeck It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 757 days.

Signed and Sealed this

Twenty-first Day of September, 2010

David J. Kappos
*Director of the United States Patent and Trademark Office*